June 11, 1935. R. F. PEO 2,004,905
HYDRAULIC SHOCK ABSORBER
Filed Aug. 25, 1934 3 Sheets-Sheet 1

Inventor
Ralph F. Peo.
by Charles Miller
Attys.

June 11, 1935.  R. F. PEO  2,004,905
HYDRAULIC SHOCK ABSORBER
Filed Aug. 25, 1934   3 Sheets-Sheet 2
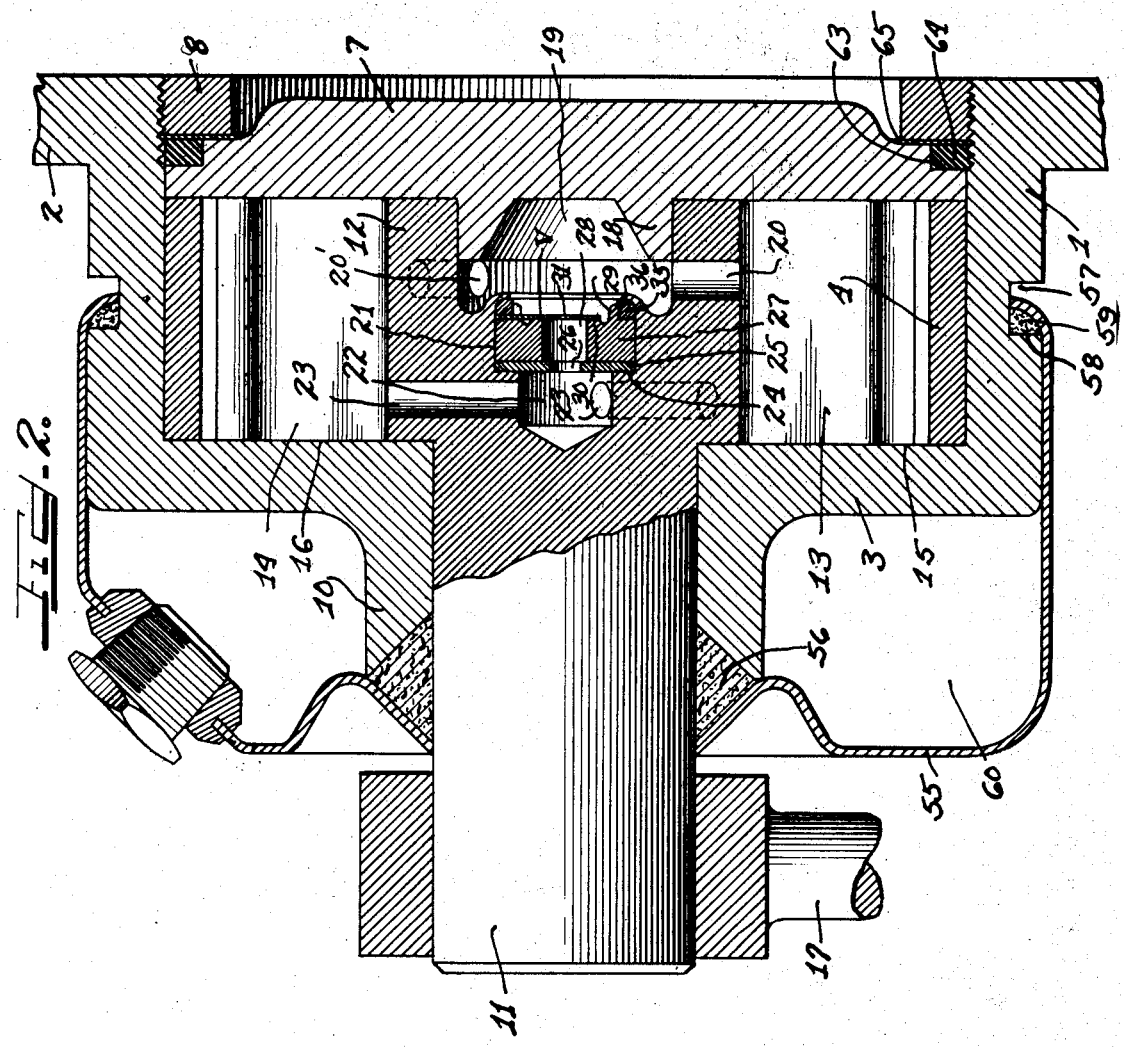
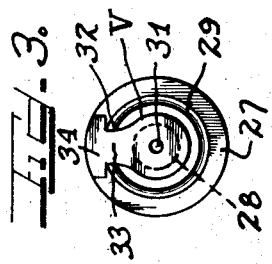
Inventor
Ralph F. Peo.
by Charles Hill
Attys.

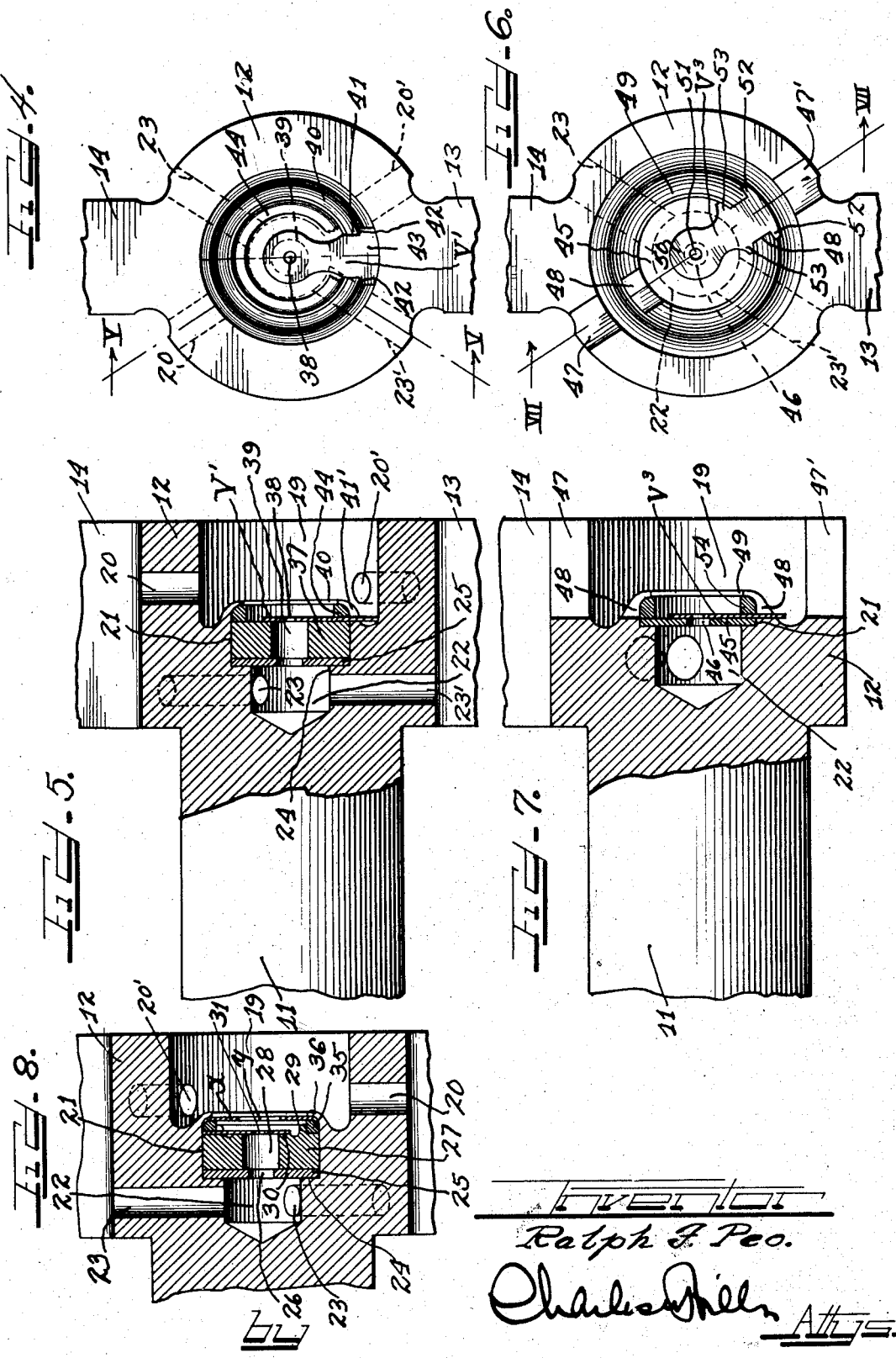

Patented June 11, 1935

2,004,905

UNITED STATES PATENT OFFICE 2,004,905

HYDRAULIC SHOCK ABSORBER

Ralph F. Peo, Buffalo, N. Y., assignor to Houde Engineering Corporation, Buffalo, N. Y., a corporation of New York Application August 25, 1934, Serial No. 741,402

10 Claims. (Cl. 188—89)

This invention relates to a hydraulic shock absorber and particularly to improved valve structure and arrangement for metering the flow of the hydraulic fluid displaced by the oscillating or reciprocating piston within the shock absorber working chamber.

The invention concerns particularly the use of a reed valve and an important object is to provide improved means for anchoring the reed valve in a fluid passageway for cooperation of a restricted metering orifice in the valve with a larger metering orifice for control and metering of the fluid flow during the compression and rebound strokes of the oscillating or reciprocating piston.

The invention also includes other features of construction, arrangement and operation, all of which features are incorporated in the structure disclosed on the accompanying drawings, in which drawings, Figure 1 is an elevational view looking at the inner or base end of the shock absorber structure with the cover structure removed to disclose my improved valving arrangement within the piston structure;

Figure 2 is a section on plane II—II Figure 1;

Figure 3 is a plan view of the valve seat and valve thereon;

Figure 4 is an end view of the piston structure showing a modified valving arrangement;

Figure 5 is a section on plane V—V Figure 4;

Figure 6 is a view similar to Fig. 4, but showing another modified valving arrangement;

Figure 7 is a section on plane VII—VII Fig. 6; and

Figure 8 is a section of the piston hub and valve assembly showing the application of stop means for limiting the flexure of the valve.

Figure 1:
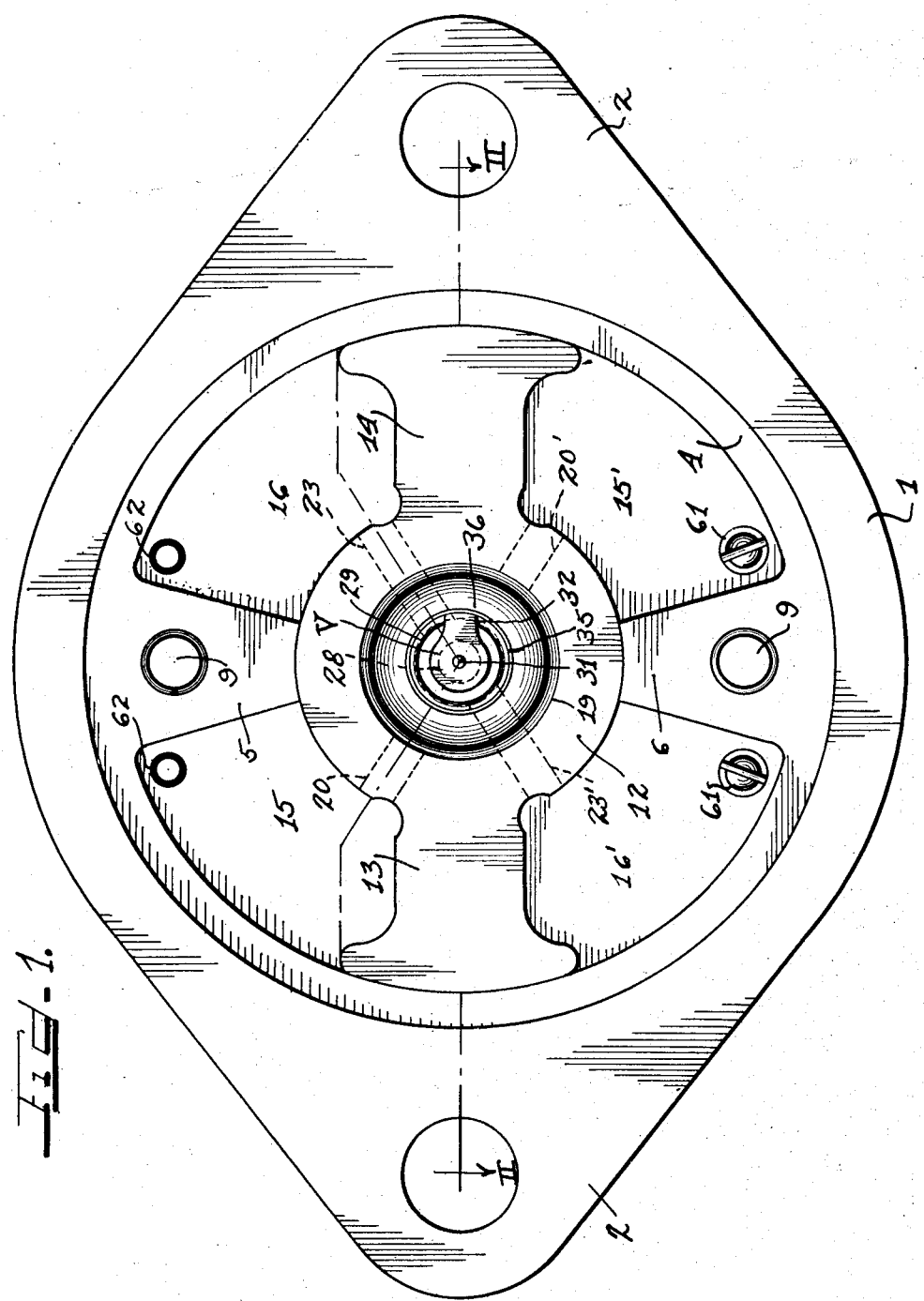

The shock absorber structure shown on Figs. 1, 2 and 3 of the drawings comprises a cup shaped housing 1 having ears 2 extending laterally from its rim whereby it may be secured to a support as for example the chassis of an automobile. Seated in the cylindrical wall of the housing 1 and against the base wall 3 thereof is a ring 4 having the partition lugs 5 and 6 extending radially therefrom at diametrically opposite points. This ring and the partition lugs are engaged by a closure or cover structure 7 fitting into the open end of the housing and clamped in place of the annular nut 8 having threaded engagement in the end of the housing, the cover structure 7 and the clamping member 8 being entirely within the rim edge of the housing so as not to interfere with seating of the structure against the support to which it is secured by means of the ears 2. Dowel pins 9 extending through the partition lugs and into the wall 3 secure the ring and partition lugs against rotational movement.

The wall 3 of the housing has the bearing extensions 10 for journaling the shaft 11 extending from the hub 12 from which vanes 13 and 14 extend from diametrical opposite sides to move between the partition lugs as the shaft is oscillated, the partition lugs and the vanes dividing the space within the ring 4 into high pressure working chambers 15 and 15' and low pressure working chambers 16 and 16'. The piston structure is operated by means of a lever 17 extending from the outer end of the shaft and connected with the axle of the vehicle.

The cover 7 has on its inner side a lug or flange 18 extending a distance into the cylindrical recess 19 in the inner end of the piston hub 12 and forms a bearing and centering support for the piston structure. The recess 19 forms a chamber connected by ports 20 and 20' with the high pressure chambers 15 and 15' respectively. The piston hub has the intermediate or valve chamber 21 concentric with but of smaller diameter than the inner chamber 19, and the outer fluid chamber 22 concentric with but of smaller diameter than the valve chamber, the fluid chamber 22 being connected by ports 23 and 23' with the low pressure working chambers 16 and 16' respectively.

Fitting into the valve pocket 21 and seated against the shoulder 24 is a disc 25 of suitable metal having the metering orifice 26 concentric with the chamber 22. Fitting into the valve chamber and seating against the disc 24 is a comparatively thick spacing and valve supporting member or washer 27 having the bore 28 concentric with the orifice 26. On its inner side, between the bore 28 and the periphery, the member 27 has the annular lip or flange 29 surrounding the valve seating face 30.

The valve member V is a thin plate of suitable metal and is of generally oblong shape, its inner end being rounded with a larger radius than that of the bore 28 so as to cover the bore, this rounded end having the restricted orifice 31 therethrough. The lip 29 on the seat member 27 has a slot 32 therein of a width to receive the neck portion 33 of the valve member, the outer or head end 34 of the valve member extending between the outside of the lip 29 and the side of the valve chamber 21 so that the valve member will be held against lateral displacement with its orifice 31 in register with the bore 28 in the seating member 27.

A locking ring 35 engages between the lip 29 and the wall of the valve chamber 21 and bears against the outer end 34 of the valve member. The recess or chamber 19 is so formed in the piston head 12 as to leave an annular lip or flange 36 surrounding the end of the valve chamber which lip may be readily spun or riveted over against the locking ring to secure it in locking position, the ring being of softer metal so as to readily distort under the riveting pressure to deflect around the side edges of the valve end 34 and to intimately engage against the end and the seat member 27 to thus rigidly anchor the valve member in proper position with the valve seat 30 member normally held against the valve seat 30 but free to flex away from the seat under fluid pressure.

When the shock absorber is in service on a vehicle, and the vehicle springs are compressed, the fluid displaced by the piston structure will flow from the low pressure chambers 16 and 16' through the ports 23 and 23' into the fluid chamber 22 and from there through the metering orifice 26 into the bore 28 in the seat member 27, the fluid pressure raising the valve member from its seat 30 so that fluid may readily flow past the valve in addition to whatever fluid will flow through the orifice 31, the fluid then flowing from the chamber 19 through the ports 20 and 20' to the high pressure chambers 15 and 15'. During rebound movement of the vehicle springs, the fluid travels in reverse direction through the path just traced except that the fluid pressure will force and hold the valve member against its seat so that the flow is metered by the restricted orifice 31 in the valve member. As the valve member and the metering disc 25 are of thin metal, the orifices therethrough will be of the sharp edge type and will effect compensation for change in temperature and viscosity of the fluid. The bore 28 forms an intermediate chamber between the orifice 26 and the valve end of the bore so that the orifice 26 may properly function to compensate for viscosity change before the fluid flows past the valve.

Figures 4 and 5 show a modified arrangement. Here the member 37 is a plain washer or spacer seating against the orifice disc 25 in the bottom of the valve chamber 21, the valve member V' seating against the plain inner face of the spacer with its metering orifice 38 in registration with the bore 39 of the spacer and the metering orifice 26 in the disc 25. The lip 40 surrounding the entrance of the valve chamber has the slot 41 in which the valve member is held aligned. The valve member has the shoulder edges 42 engaging the sides of the slot 41, the head 43 of the valve extending between the outer side of the lip 40 and the wall of the piston hub surrounding the chamber 19 so that the engagement of the head with the lip and with this wall will hold the valve structure properly aligned and against lateral displacement. The locking ring 44 is then pressed and rigidly held against and around the valve member and against the face of the spacer 37 by riveting over the end of the lip 40 against the locking ring.

Figures 6 and 7 show another modified arrangement. Like in the previous arrangements, the piston hub 12 has the inner fluid chamber 19, the outer fluid chamber 22 and the intermediate or valve chamber 21. However, in the modified valve assembly shown, the spacing member or washer is omitted and the valve member V³ seats directly against the orifice disc 45 in the bottom of the valve chamber which disc has a metering orifice 46 in registration with the chamber 22, this chamber being connected by ports 23 and 23' with the low pressure working chambers, and these ports may be drilled.

The hub is milled to form the ports or passages 47 and 47' connecting the chamber 19 with the high pressure working chambers of the shock absorber and this milling is extended in order to cut slots 48 in the lip or flange 49 surrounding the valve chamber. One of these slots 48 will serve to receive and align the valve member V³. This valve member has the circular inner end 50 provided with the restricted metering orifice 51 and the outer end or head of the valve member is notched at its opposite sides to leave the inner and outer abutment shoulders 52 and 53. These inner and outer shoulders engage respectively against the inner and outer sides of the lip 49 so that the valve member will be anchored against longitudinal displacement and the engagement of the sides of the valve head with the sides of the slots 48 will hold the valve member against lateral displacement. The locking ring 54 is inserted in the lip 49 and the end of the lip is then deflected or riveted over against the ring to force the ring intimately against and around the valve and against the seating disc 45. The valve orifice will then be in register with the disc orifice 46 and during flow from the high pressure to the low pressure working chambers the valve will be held against its seat so that the flow will be only through this restricted valve orifice. The flow from the low pressure to the high pressure chambers will be metered by the port 46 in the disc 45 and the valve will be deflected from its seat to offer no material resistance to such flow.

It is evident that, instead of seating the valve directly against the metering disc 45, a spacer affording an expansion chamber could be interposed between the valve and the disc as in the other arrangements shown. The orifices could then function unobstructedly to compensate for change in temperature and viscosity of the fluid.

When the valve is subjected to considerable flow pressure, it will be advisable to apply some means for limiting the flexure of the valve away from its seat during flow from the low pressure to the high pressure chambers so that the valve will not be flexed beyond its elastic limit and will always fully seat after each flexure. On Figure 8, I have shown stop means applied to the valving arrangement shown on Figures 1, 2 and 3. Such stop means may be in the form of a disc X applied against the outer side of the locking ring 35 so that when the lip 36 is riveted over against the stop disc it will secure the disc in place and at the same time securely hold the locking ring for clamping the valve structure in place. The top disc will have the opening Y therethrough which will be of considerably larger diameter than the valve orifice 31 but of less diameter than the circular inner end of the valve. The fluid flow through the valve orifice will therefore not be interfered with, and the flexure movement of the valve will be limited by its engagement with the stop disc. It is of course evident that a stop disc or other stop means may be provided in connection with the valving assembly shown on Figures 4 to 7.

Referring to Figures 1 and 2, a cup shaped shell 55 intimately receives the outer end of the housing 1 and in its face has an opening for receiving the shaft 11, there being packing material 56 between the end of the bearing extension 10 and the shell 55. The housing 1 has the annular channel 57 forming an abutment shoulder 58, the rim of the shell 55 being deflected into the channel and around the shoulder 58, packing material 59 being interposed.

The shell 55 forms the outer wall of a fluid reservoir 60 which is connected with the lower working chambers through check valve controlled passages 61 in a manner well understood in the art, and the upper working chambers are connected by vent passages 62 with the reservoir for the removal of air and gases from the working chambers.

The cover 7 has the annular peripheral recess 63 for receiving packing material 64, a washer 65 being interposed between the clamping ring 8 and the cover and packing material to form a sealed joint for preventing leakage of fluid to the exterior of the working chambers at the cover structure.

I have shown and described practical and efficient embodiments of the various features of my invention but I do not desire to be limited to the exact construction and operation shown and described, and changes and modifications may be made without departing from the scope of the invention.

I claim as my invention:

1. In a hydraulic shock absorber, a housing for hydraulic fluid, a piston structure operable in said housing to displace the fluid, means defining a path for the flow of the displaced fluid, a wall defining a valve chamber, a seat member in said valve chamber having an opening therethrough included in said path, a flap valve whose inner end covers said opening and has an orifice in registration with said opening, said wall having a recess in which the outer end of said valve engages to be held thereby against lateral displacement, and means for holding said valve against said seat for movement of the inner end of said valve to permit flow in one direction through said opening and closure of said opening by said valve to confine the flow to said orifice.

2. In a hydraulic shock absorber, a housing for hydraulic fluid, a piston structure operable in said housing to displace the fluid, means defining a path for the flow of the displaced fluid, a wall defining a valve chamber, a seat in said valve chamber having an opening therethrough included in said path, a flap valve engaging said seat with its inner end covering said opening and having an orifice communicating with said opening, said wall having abutments between which the outer end of said valve engages to be held in lateral alignment on said seat, and a retaining member for holding said valve against said seat.

3. In a hydraulic shock absorber, the combination of a housing for hydraulic fluid, a piston structure operable in said housing to displace the fluid therein, means defining a path for the flow of displaced fluid, a wall defining a valve chamber, a seat in said valve chamber having an opening for inclusion in said path, a flap valve engaging said seat with its inner end overlapping said opening and having an orifice in register therewith, an annular lip on said wall surrounding the end of said valve chamber and having a notch receiving the outer end of said valve for holding said valve in lateral alignment, a retainer ring within said lip engaging said valve seat, said lip being deflected against said ring to hold said ring in position to clamp said valve against the seat.

4. In a hydraulic shock absorber the combination of a housing for hydraulic fluid, a piston structure operable in said housing to displace the fluid therein, means defining a path for the displaced fluid, a wall defining a valve chamber, a seat in said valve chamber having an opening for inclusion in said path, a flap valve extending across the face of said seat with its inner end overlapping said opening and having a metering orifice, said wall having a recess receiving the outer end of said valve and said valve having shoulders engaging said wall whereby said valve is held against lateral displacement, a locking member in said valve chamber, the end of said wall being deflected against said locking member to hold it in position to clamp said valve against said seat with its inner end free to flex for free flow through said opening or for restricted flow through said orifice.

5. In a hydraulic shock absorber, the combination of a housing for hydraulic fluid, a piston operable in said housing to displace the fluid, means defining a path for the flow of the displaced fluid, a wall defining a valve chamber, a seat in said valve chamber having an opening for inclusion in said path, a flap valve arranged on said seat with its inner end covering said opening and having a metering orifice in registration therewith, abutments on said seat engaging the sides of said valve to hold it against lateral displacement, and a clamping member engaging the outer end of said valve to hold it against said seat with its inner end free to flex for exposure of said opening to flow or for restricting the flow through said orifice.

6. In a hydraulic shock absorber, the combination of a housing for hydraulic fluid, a piston structure operable in said housing to displace the fluid, means defining a path for the flow of the displaced fluid, a wall defining a valve chamber, a seat in said valve chamber having an opening for inclusion in said path, a flap valve engaging said seat and extending across said opening and provided with a metering orifice in registration with said opening, a notched lip on said seat receiving the outer end of said valve to hold it against lateral displacement, and a clamping ring engaging said seat outside of said lip for holding said valve against said seat with its inner end free to flex for exposure of said opening or for closure of said opening except for said orifice.

7. In a hydraulic shock absorber, the combination of a housing for hydraulic fluid, a piston structure operable in said housing to displace the fluid, means defining a path for the displaced fluid, a wall defining a valve chamber, a seat in said valve chamber having an opening for inclusion in said path, a flap valve arranged on said seat with its inner end across said opening and provided with a metering orifice in registration therewith, an annular lip surrounding said opening and having a recess for receiving the outer end of said valve to hold said valve against lateral displacement, and a retainer ring in said valve chamber engaging the outer end of said valve to hold it against said seat with its inner end free to flex for exposure of said opening to fluid flow or for closure of said opening to flow except for said orifice.

8. In a hydraulic shock absorber, the combination of a housing for hydraulic fluid, a piston structure operable in said housing to displace the fluid, means defining a path for the displaced fluid, a wall defining valve chamber, a fluid metering assembly in said valve chamber comprising an orifice disc, a flap valve and an intermediate member, said intermediate member having a bore therethrough, said orifice disc having a metering orifice communicating with one end of said bore, the inner end of said flap valve extending across the other end of said bore and having a metering orifice communicating with said end, interengaging abutment on said wall and said valve for holding said valve against lateral displacement, and a retaining member in said valve chamber for holding said valve at its outer end against said intermediate member with its inner end free to flex to uncover said opening or to restrict the flow therethrough except for said orifice.

9. In a hydraulic shock absorber, the combination of a housing for hydraulic fluid, a piston operable in said housing to displace the fluid, means defining a passage for the flow of the displaced fluid, a valve seat surrounding said passage, a flap valve arranged on said seat with its inner end extending across said passage and having a metering orifice in registration therewith, a clamping member engaging the outer end of said valve to hold it against said seat with its inner end free to flex for full exposure of said passage to flow or for confining the flow to said orifice, and stop means limiting the flexure of said valve.

10. In a hydraulic shock absorber, the combination of a housing for hydraulic fluid, a piston operable in said housing to displace the fluid, means defining a passage for the flow of the displaced fluid, a valve seat surrounding said passage, a flap valve arranged on said seat with its inner end extending across said passage and having a metering orifice in registration therewith, a clamping member engaging the outer end of said valve to hold it against said seat with its inner end free to flex for full exposure of said passage to flow or for confining the flow to said orifice, and a stop member secured by said clamping means for limiting the flexure of said valve.

RALPH F. PEO.